UNITED STATES PATENT OFFICE.

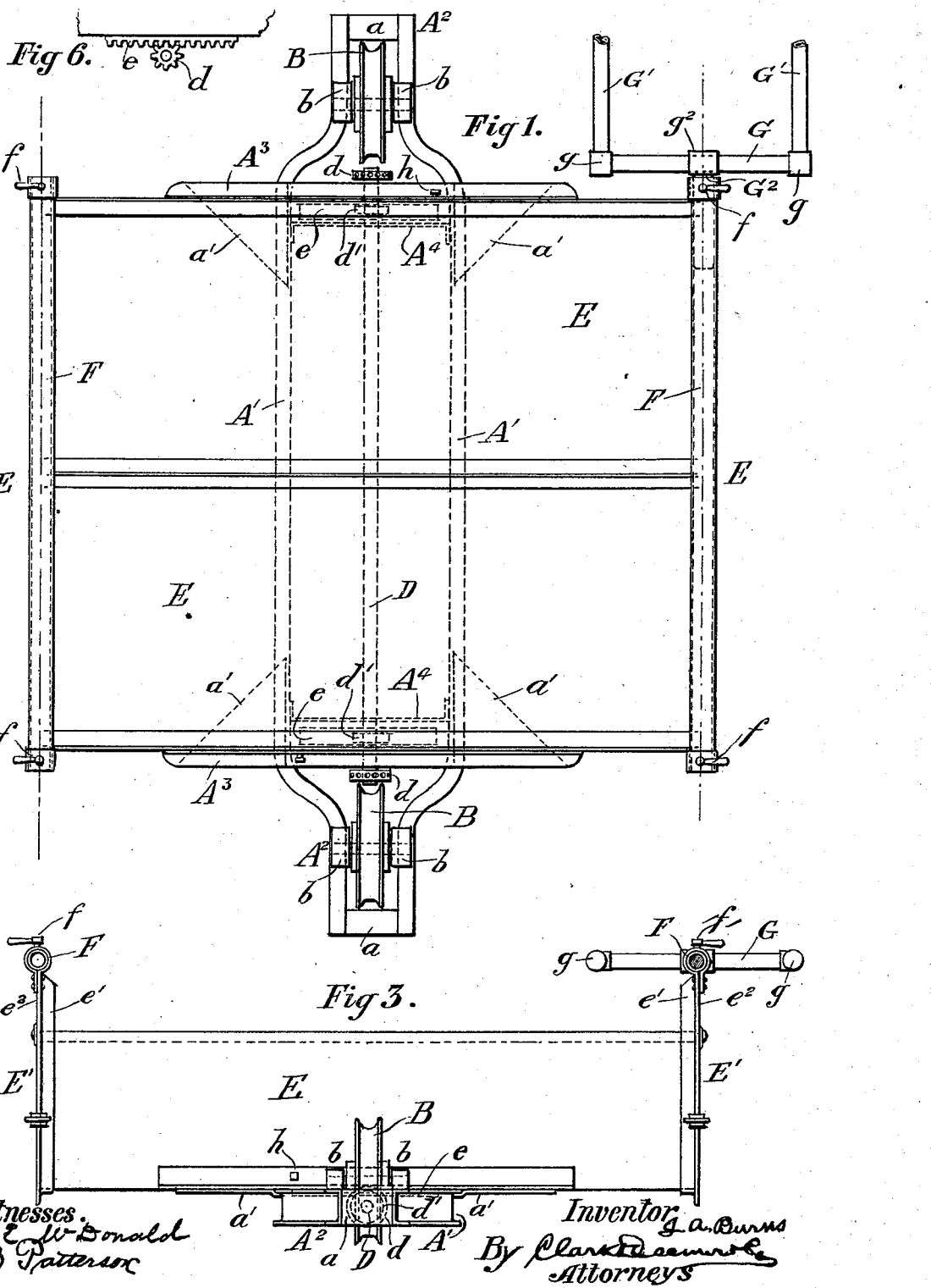

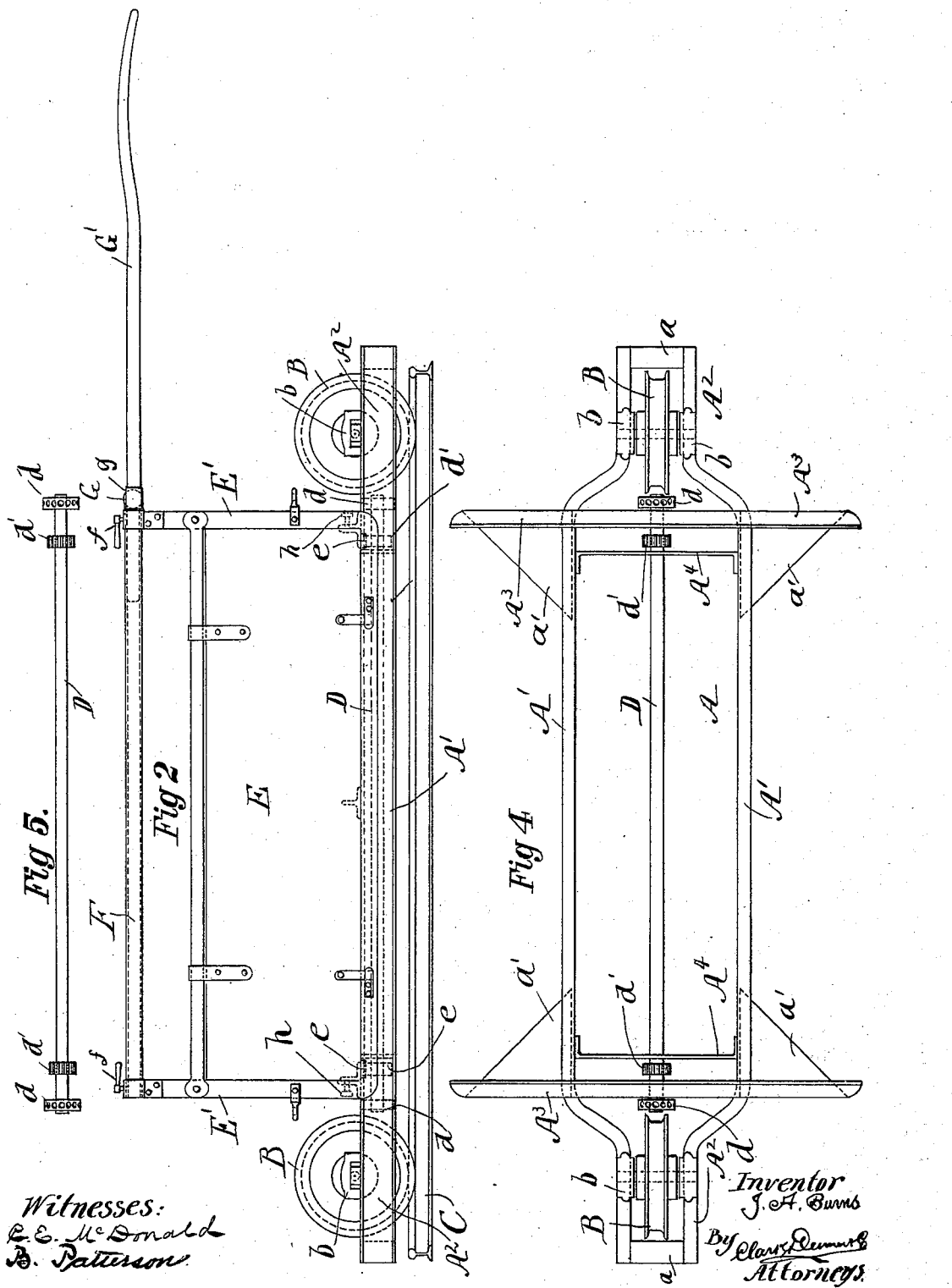

JOHN ALEXANDER BURNS, OF NEW YORK, N. Y.

ROLLING-STOCK.

SPECIFICATION forming part of Letters Patent No. 695,708, dated March 18, 1902.

Application filed December 9, 1901. Serial No. 85,194. (No model.)

*To all whom it may concern:*

Be it known that I, JOHN ALEXANDER BURNS, a subject of the King of Great Britain, and a resident of New York, county of New York, and State of New York, have invented certain new and useful Improvements in Rolling-Stock, of which the following is a specification, reference being had to the accompanying drawings, forming a part thereof, in which similar letters of reference indicate corresponding parts.

The present invention relates to that class of rolling-stock designed for use on a one-rail track and moved along the same by man or animal power. Among the more prominent objects of the invention is the balancing of the load to enable the moving power to be brought nearer to the track and in a more effective position.

With the above and other purposes in view the invention comprises a truck mounted on the wheels taking the single track and carrying a body capable of lateral movement on the truck for the purpose of balancing the load and permitting the moving power to be brought effectively nearer the track, as aforesaid.

The improved rolling-stock additionally embodies other novel features and details which are also clearly described hereinafter.

In the accompanying drawings, forming part of this specification, Figure 1 is a plan view of a car embodying my invention. Figs. 2 and 3 are side and end views, respectively, of the novel car. Fig. 4 is a plan of the truck. Fig. 5 is a detail view of the adjusting-shaft and parts carried thereby, and Fig. 6 is a fragmentary end view showing more particularly one of the racks and pinions.

The main part of the frame A of the truck is presented by two lengths of channel-iron A' A', bent to conjointly form the contracted end portions $A^2$, secured at their terminals to blocks $a$. Wheels B B, located in the contracted end portions $A^2$, have their axles turning in bearings $b$, carried by the latter. These wheels have durable flanged peripheries to securely take the bearing portion of the rail C. Two transverse bars $A^3$, also of angle-iron, are on the upper side of the truck and extend for some distance at the sides of the same. These bars are located near the contracted end portions of the truck, as indicated most clearly in Figs. 1 and 4. Angular webs or plates $a'$, connected to the extended portions of the bars $A^3$ and to the side members $A'$, rigidly hold said bars in position, the plates being so shaped that they are flush with the top surfaces of the rails $A'$ of the truck to form part of the bearing on which the body is to slide. Transverse braces $A^4$, connecting the side members $A'$ near the bars $A^3$, serve as bearings for a longitudinal shaft D, the ends of which project beyond the bars $A^3$, and have keyed therein small jack-wheels $d$, any of the radial sockets of which is adapted to receive the end of a suitable jack-rod or lever for permitting the shaft D to be revolved by hand.

E refers to the body, the frame of which is made of angle-iron to impart strength as well as simplicity. This body rests on the bearing portions of the truck between the bars $A^3$, the latter serving as guides for said body in its transverse movements. On the under side of the body, at each end, are rigidly secured short transverse racks $e$ in mesh with pinions $d'$ therefor, keyed in the shaft D beneath, the disposition of the bearing-surfaces on the truck for the body being such that the load is sustained by said surfaces and not imposed on the pinions. Hence the rack-and-pinion engagement is not jammed, but is capable of being worked with less effort than would otherwise be necessary. The under surfaces of those portions of the body which bear upon the truck are rigid and smooth, so that said body may slide laterally with a minimum of friction in either direction.

Each of the angle-irons forming the vertical corner members $E'$, of the body-frame, has at its upper portion one of the leaves $e'$ cut off and the other leaf $e^2$ bent riveted for securely embracing the end of one of the side tubes F F, which extend the full length of the body.

The balance draft devices comprise the short transverse tube G, having the end loops $g$, in which are secured the rear ends of the shafts $G'$. A tubular butt or neck $G^2$ has its forward looped end $g^2$ securely embracing the tube G, while its body portion bears in the socket presented by open end of the contiguous tube F and is secured in position by a clamping-screw $f$. By this arrangement the draft devices can be detachably secured to any desired corner of the body.

From the description thus far it will be easy to understand that the shaft D can be rotated by hand to an extent that will cause the rack-and-pinion devices to laterally shift the loaded body so as to balance the same with respect to the draft devices and bring the latter to a nearer and effective position relative to the single track. The body will be securely held in any of its balanced positions by bolts $h$, bearing in the vertical leaves of the guide-bars A³ and adapted to engage the lower portions of the body.

The novel rolling-stock is readily adjusted and balanced and can be more efficiently moved with less power than would otherwise be the case. The general construction of the rolling-stock is strong and simple.

I do not wish to be understood as limiting myself to the particular form and arrangement shown and described, as modifications and changes may be made in the details thereof and the rolling-stock still be within the spirit of my invention.

Having now described my invention, what I claim as new, and desire to secure by Letters Patent, is—

1. The combination with a truck or frame having the longitudinally-disposed wheels adapted for a single track, of a car-body mounted and laterally movable thereon, and draft devices connected to one side of the body.

2. The combination with a truck or frame having the longitudinally-disposed wheels adapted for a single track, of a car-body mounted and laterally movable thereon, means for securing said body in any of its adjusted positions, and draft devices connected to one side of the body.

3. The combination with a truck or frame having the longitudinally-disposed wheels adapted for a single track, and provided with transverse guides, of a car-body mounted and laterally movable on said truck between said guides, and draft devices connected to one side of the body.

4. The combination with a truck or frame having the longitudinally-disposed wheels adapted for a single track and provided with transverse guides, of a car-body mounted and laterally movable on said truck between said guides, bolts bearing in said guides for engaging said body to hold it in its adjusted position, and draft devices connected to one side of the body.

5. The combination with a truck or frame having the longitudinally-disposed wheels adapted for a single track and having the transverse guides extending at each side of the truck, angle-plates connecting the guide extensions with the truck and bent to form part of a top bearing-surface, a body laterally movable upon the latter between the guides, and draft devices secured to one side of the body.

6. The combination with a truck or frame having the longitudinally-disposed wheels adapted for a single track, of a longitudinal shaft bearing in said truck and provided with pinions, a body having lower transverse racks engaged by said pinions, means for rotating said shaft, and draft devices connected to one side of the body.

7. The combination with a truck or frame having the longitudinally-disposed wheels adapted for a single track, and transverse guides, of a longitudinal shaft bearing in said truck and provided with pinions and an end jack-wheel, a body laterally movable between said guides and having lower racks engaged by said pinions, and draft devices connected to one side of the body.

8. In rolling-stock adapted for a single rail, the combination with a body having sockets and clamping provision at its upper corners, of a draft device comprising a neck for bearing and clamping in either of the sockets.

9. In rolling-stock adapted for a single rail, the combination with a body provided with upper open-ended tubes, and clamping-screws at the ends thereof, of draft devices comprising a tubular neck or butt for bearing and clamping in either of the ends of said tubes.

10. In rolling-stock for a single rail, the combination with a body having vertical corner channel-irons, with one of the leaves removed, and the other bent and riveted to present a loop; of a clamping-screw bearing in the latter, and draft devices comprising a tubular neck or butt, for being clamped in the said loop, and detached therefrom.

11. In rolling-stock adapted for a single rail, and including a body, draft devices including the transverse tube G, having end loops, in which such draft devices are socketed, and a longitudinal neck, having a loop embracing the tube, and connected to one side of the body.

In testimony that I claim the foregoing as my invention, I have signed my name, in presence of two witnesses, this 6th day of December, 1901.

JOHN ALEXANDER BURNS.

Witnesses:
C. E. McDONALD,
BELLE PATTERSON.